(12) United States Patent
Fox

(10) Patent No.: US 12,277,599 B2
(45) Date of Patent: Apr. 15, 2025

(54) SYSTEMS AND METHODS FOR OBTAINING ACCOUNTANT PREPARED FINANCIAL STATEMENT CONFIRMATION

(71) Applicant: Capital Confirmation, Inc., Brentwood, TN (US)

(72) Inventor: Charles Brian Fox, Brentwood, TN (US)

(73) Assignee: Capital Confirmation, Inc., Brentwood, TN (US)

( * ) Notice: Subject to any disclaimer, the term of this patent is extended or adjusted under 35 U.S.C. 154(b) by 204 days.

(21) Appl. No.: 18/144,998

(22) Filed: May 9, 2023

(65) Prior Publication Data

US 2023/0274350 A1  Aug. 31, 2023

Related U.S. Application Data

(63) Continuation of application No. 14/180,754, filed on Feb. 14, 2014, now Pat. No. 11,861,696.

(60) Provisional application No. 61/764,614, filed on Feb. 14, 2013.

(51) Int. Cl.
*G06Q 40/03* (2023.01)
*G06Q 40/12* (2023.01)

(52) U.S. Cl.
CPC ............. *G06Q 40/03* (2023.01); *G06Q 40/12* (2013.12)

(58) Field of Classification Search
CPC ......... G06Q 40/03; G06Q 40/12; G06Q 40/02
See application file for complete search history.

(56) References Cited

U.S. PATENT DOCUMENTS

| | | |
|---|---|---|
| 5,813,006 A | 9/1998 | Polnerow et al. |
| 5,875,435 A | 2/1999 | Brown |
| 6,029,146 A | 2/2000 | Hawkins et al. |
| 6,058,375 A | 5/2000 | Park |
| 6,185,683 B1 | 2/2001 | Ginter et al. |
| 6,192,348 B1 | 2/2001 | Mrva et al. |
| 6,246,999 B1 | 6/2001 | Riley et al. |
| 6,327,578 B1 | 12/2001 | Linehan |
| 6,330,545 B1 | 12/2001 | Suh |
| 6,442,533 B1 | 8/2002 | Hinkle |
| 6,601,175 B1 | 7/2003 | Arnold et al. |
| 6,622,128 B1 | 9/2003 | Bedell et al. |
| 6,640,307 B2 | 10/2003 | Viets et al. |
| 6,643,625 B1 | 11/2003 | Acosta et al. |

(Continued)

FOREIGN PATENT DOCUMENTS

WO  2012045117 A1  4/2012

*Primary Examiner* — Ariel J Yu
(74) *Attorney, Agent, or Firm* — Patterson Intellectual Property Law, PC

(57) ABSTRACT

A system and method facilitates obtaining accountant prepared financial statements associated with a client. An accountant is identified to the confirmation system by a client, or the client is identified by the accountant, wherein financial statements associated with the client are received from the accountant via the communications network. The client is only allowed to review and release, but not alter, the financial statements, and further provides permissions associated with the financial statements with respect to approved financial statement users. The financial statements are provided via the communications network to the approved financial statement users in accordance with the permissions provided by the client.

14 Claims, 6 Drawing Sheets

(56) References Cited

U.S. PATENT DOCUMENTS

| | | |
|---|---|---|
| 6,714,944 B1 | 3/2004 | Shapiro et al. |
| 6,839,843 B1 | 1/2005 | Bacha et al. |
| 7,177,849 B2 | 2/2007 | Fieschi et al. |
| 7,206,768 B1 | 4/2007 | Degroeve et al. |
| 7,383,232 B2 | 6/2008 | Fox |
| 7,831,488 B2 | 11/2010 | Fox |
| 7,885,900 B1 | 2/2011 | Bender |
| 7,945,489 B2 | 5/2011 | Weiss et al. |
| 8,200,527 B1 | 6/2012 | Thompson et al. |
| 8,255,304 B1 | 8/2012 | Lorenzo |
| 8,386,352 B1 * | 2/2013 | Bhatt .................. G06Q 40/02 705/30 |
| 8,543,475 B2 | 9/2013 | Fox |
| 8,762,243 B2 | 6/2014 | Jenkins et al. |
| 2001/0034611 A1 | 10/2001 | Doya et al. |
| 2001/0044737 A1 | 11/2001 | Halligan et al. |
| 2001/0051902 A1 | 12/2001 | Messner |
| 2001/0056387 A1 | 12/2001 | Magary et al. |
| 2002/0010664 A1 | 1/2002 | Rabideau et al. |
| 2002/0077941 A1 | 6/2002 | Halligan et al. |
| 2002/0082891 A1 | 6/2002 | Mckay et al. |
| 2002/0082965 A1 | 6/2002 | Loeper |
| 2002/0087441 A1 | 7/2002 | Wagner, Jr. et al. |
| 2002/0095344 A1 | 7/2002 | Mares |
| 2002/0102212 A1 | 8/2002 | Black |
| 2002/0107764 A1 | 8/2002 | Mccoy |
| 2002/0138376 A1 | 9/2002 | Hinkle |
| 2002/0152142 A1 | 10/2002 | Schellmann et al. |
| 2003/0023531 A1 | 1/2003 | Fergusson |
| 2003/0040935 A1 | 2/2003 | Magee |
| 2003/0078896 A1 | 4/2003 | Fox |
| 2003/0097317 A1 | 5/2003 | Burk et al. |
| 2003/0149645 A1 | 8/2003 | Flynn et al. |
| 2003/0220854 A1 | 11/2003 | Chu et al. |
| 2003/0225638 A1 | 12/2003 | Secola |
| 2004/0044617 A1 | 3/2004 | Lu |
| 2004/0083148 A1 | 4/2004 | Chadrow |
| 2004/0093304 A1 | 5/2004 | Lee et al. |
| 2005/0131818 A1 | 6/2005 | Desal et al. |
| 2005/0192899 A1 | 9/2005 | Reardon |
| 2007/0185797 A1 | 8/2007 | Robinson |
| 2008/0120210 A1 | 5/2008 | Leventhal |
| 2009/0171800 A1 | 7/2009 | Phillips et al. |
| 2010/0121767 A1 | 5/2010 | Coulter et al. |
| 2010/0161460 A1 * | 6/2010 | Vroom .................. G06Q 40/02 715/764 |
| 2011/0088090 A1 | 4/2011 | O'Brien et al. |
| 2011/0119179 A1 | 5/2011 | Votaw et al. |
| 2011/0125648 A1 | 5/2011 | Price et al. |
| 2011/0270748 A1 | 11/2011 | Graham, III et al. |
| 2012/0090038 A1 | 4/2012 | Pacella et al. |
| 2012/0158580 A1 | 6/2012 | Eram et al. |
| 2012/0191580 A1 | 7/2012 | Bhatt |
| 2012/0259752 A1 | 10/2012 | Agee |
| 2013/0074311 A1 | 3/2013 | Vastmans et al. |

* cited by examiner

SYSTEMS AND METHODS FOR OBTAINING ACCOUNTANT PREPARED FINANCIAL STATEMENT CONFIRMATION

CROSS-REFERENCES TO RELATED APPLICATIONS

This application is a continuation of U.S. patent application Ser. No. 14/180,754, filed Feb. 14, 2014, which further claims benefit of U.S. Provisional Patent Application Ser. No. 61/764,614, filed Feb. 14, 2013, each of which are incorporated herein by reference in their respective entireties.

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

BACKGROUND

The present invention pertains to systems, methods and computer program readable medium providing a secure electronic intermediary service between financial statement providers, their clients and the users of the financial statements (i.e., lending institutions, investors, business partners, etc.) to reduce time, resources, and costs necessary to confirm financial statements.

When a business or individual applies to borrow money from a lending institution (e.g., a bank), the lending institution typically requires financial statements from the business. The borrower (e.g., the Client) must typically provide financial statements such as a balance sheet, a tax return, and an income statement to the lending institution. Items on the financial statements include but are not limited to assets, debt, receivables, payables, investments and transaction details. These financial statements may be but are not necessarily audited, compiled, reviewed and/or prepared financial statements by the financial statement providers which can include Certified Public Accounting Firms, Chartered Accountants, and Tax Preparers. The conventional practice is for the lender to receive financial statements prepared by a certified public accountant (CPA) in the relevant jurisdiction from the CPA or from a principal/partner at the business.

The conventional approach presents several problems. The financial statements are provided to the financial statement users (i.e., lending institutions) by the client and do not come directly from the financial statement providers to the financial statement users and because financial statement confirmation is a time and resource intensive process, the lending institution may not confirm the accuracy and/or validity of the financial statements with the CPA that generated the financial statements. This creates opportunities for an unscrupulous client (e.g., borrower, individual or company) to fabricate the financial statements while either signing the name of a legitimate financial statement provider or altering the information in the financial statements without the financial statement provider's knowledge, and then providing those misleading and falsified financial statements to the financial statement users. Also, the lending institution may not realize the license status or lack of a valid license of the individual CPA, CPA firm, or entity purporting to be a CPA firm that generated the financial statements. Thus, the financial statement provider may be operating on a fake license, an expired license, or an entirely fabricated license which can, for example, cause problems with loan insurance payouts if the resulting loan goes into default.

Financial statement users such as lending institutions vary in how and if they confirm financial statement information, though larger lending institutions have one or more centers devoted solely to processing financial statement information. Additional costs are incurred when the employees work overtime and/or employ temporary staffing to meet the demand needed to process the financial statement information. Further, manually confirming the information in the financial statements and the validity of the financial statement provider takes a significant amount of time (e.g., a week or more) which results in lost time and revenue to the lending institution and a delay in obtaining a loan to the business (i.e., client). Financial statement users such as investors may invest in businesses or in people based on their belief that the financial statements provided by the client are legitimate and that they were created by an appropriately certified and/or licensed individual and/or firm.

BRIEF SUMMARY

According to one aspect of the present invention, a method is provided for confirming the license status and identity of a purported financial statement provider (e.g., certified public accountant (CPA), CPA firm, or other such entity) preparing financial statements for the client which is in turn provided to a financial statement user such as a lending institution on behalf of a business or individual applying for a loan. The financial statements must be provided to the lending institution by the business (e.g., client) applying for a loan according to existing financial regulations. Because financial statements may only be released by the business, the confirmation system allows financial statements provided from a financial statement provider to be provided to a financial statement user unaltered under permissions set by the client and with approval by the client via the confirmation system. In some embodiments, the financial statement provider (e.g., accountant) can verify the veracity of the financial statements before they are ultimately provided to the financial statement user (e.g., lending institution) either by providing the financial statements to the confirmation system, or by approving the financial statements after they are uploaded to the confirmation system by the client. Optionally, the method includes confirming financial information in financial statements submitted to a lending institution by a business applying for a loan from the lending institution.

In another aspect of the invention, a method of obtaining accountant prepared financial statements associated with a client includes receiving, via a communications network, an identity of a client from a financial statement user. An identity of an accountant is received from a client via the communications network. Financial statements associated with the client are received from the identified accountant via the communications network. The received financial statements include financial information associated with the client. Permissions associated with the financial statements are received from the client via the communications network. The financial statements are provided via the communications network to the financial statement user in accordance with the permissions provided by the client.

In another aspect of the invention, a method of obtaining accountant prepared financial statements associated with a client includes receiving, via a communications network, an identity of an accountant from a financial statement user. An identity of a client is received from the accountant via the communications network. Financial statements associated with the client are received from the identified accountant via the communications network. The received financial statements include financial information associated with the client. Permissions associated with the financial statements are received from the client via the communications network. The financial statements are provided via the communications network to the financial statement user in accordance with the permissions provided by the client.

DETAILED DESCRIPTION

Figure 1:
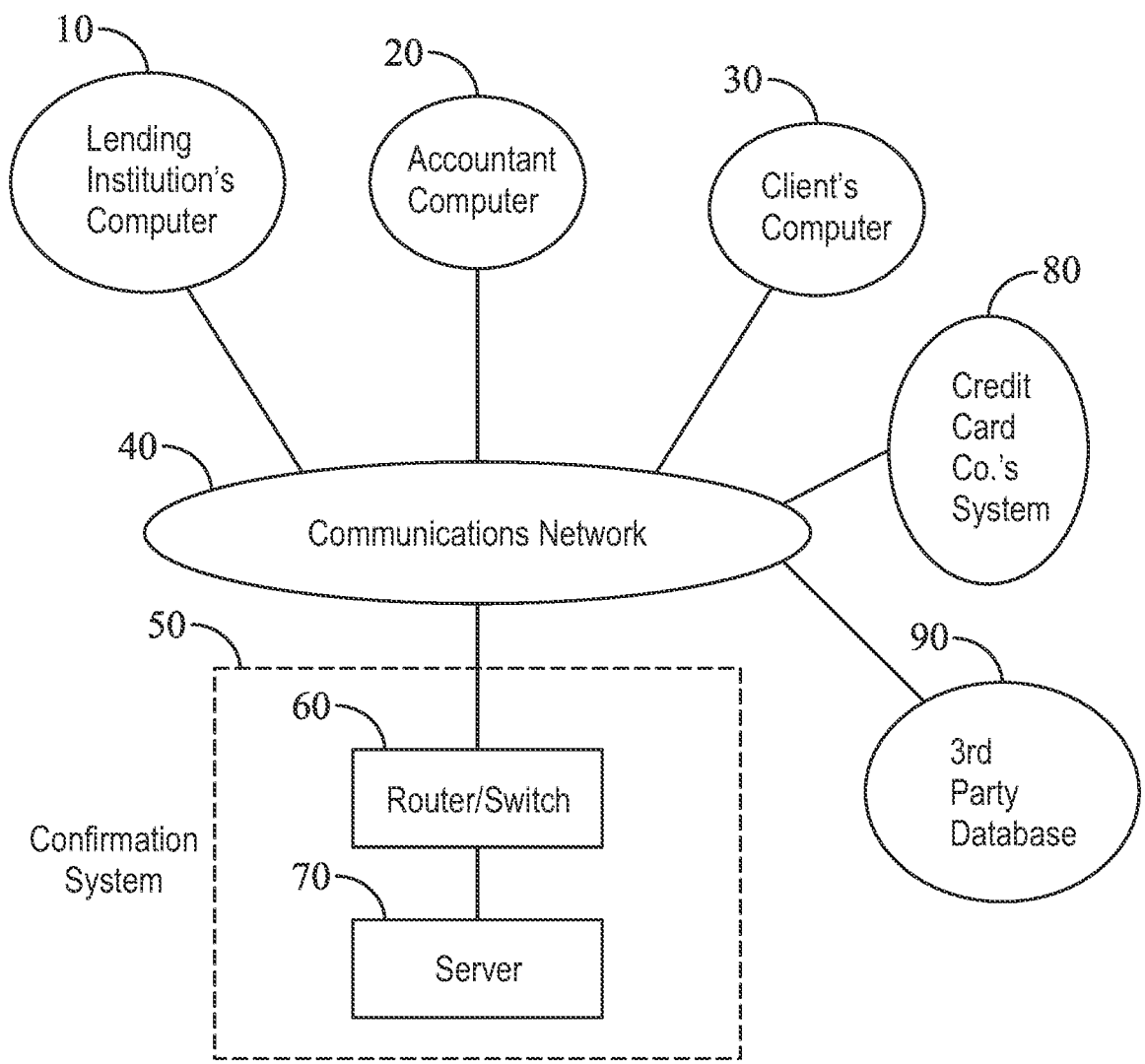
FIG. 1 is a block diagram illustrating the architecture of various systems interacting with a confirmation system according to one embodiment of the present invention.

The present invention now will be described more fully hereinafter with reference to the accompanying drawings, in which preferred embodiments of the invention are shown. The present invention may, however, be embodied in many different forms and should not be construed as limited to the embodiments set forth herein; rather, these embodiments are provided so that this disclosure will be thorough and complete, and will fully convey the scope of the invention to those skilled in the art Like numbers refer to like elements throughout.

The present invention is described below with reference to block diagrams and flowchart illustrations of methods, apparatus (e.g., systems) and computer program products (e.g., computer executable instruction modules) according to an embodiment of the invention. It will be understood that each block of the block diagrams and the flowchart illustrations, and combinations of blocks in the block diagrams and combinations of the blocks in the flowchart illustrations, can be implemented by computer program instructions. These computer program instructions may be loaded onto a general purpose computer, special purpose computer, or other programmable data processing apparatus to produce a machine, such that the instructions that execute on the computer or other programmable data processing apparatus create means for implementing the functions specified in the block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks of the flowchart, or block or blocks of the diagrams.

Accordingly, blocks of the block diagrams and the flowchart illustrations support combinations of means for performing the specified functions, combinations of steps for performing the specified functions and program instructions or modules for performing the specified functions. It will also be understood that each block of the block diagrams and the flowchart illustrations, and combinations of the respective blocks, can be implemented by special purpose hardware-based computer systems which perform the specified functions or steps, or combinations of special purpose hardware and computer instructions.

Further, the terms "lending institution", "accountant", and "client" are used based on the context, and may refer to a computer system operated by the entity, a user, a person affiliated with the entity operating the computer system, or the entity in general. The appropriate meaning to be applied should be clear from the context. Further, although the principles of the present invention are illustrated using an "accountant", this is not limited to an accountant. The "accountant" may be a bookkeeper, accounting firm, or accountants internal to the business identified by the financial statements. Further, as seen below, the "accountant" is intended to include a purported accountant or bookkeeper. The financial statement information to be confirmed is not limited to accounting parameters or accounting functions. Similarly, though the illustrative embodiments are described in terms of a "bank" as one example of a lending institution requesting financial statement confirmation, other types of financial institutions, non-financial institutions, charities, non-governmental organizations, agencies, or governmental organizations as users requiring confirmation responses are possible within the meaning of the term lending institution. Further, a "bank", "lender", or "lending institution" can also mean an investor, investment firm, equity group, or other user of the financial statements who takes action based on the financial statements. All of the above examples of lending institutions and financial institutions may also be referred to as "financial statement users." Further, the "client" may be a business, an individual or other borrower or a seller of equity in a business.

FIG. 1 illustrates one embodiment of the architecture and typical user entities that may interact with confirmation system 50 to achieve automated third-party confirmations. As seen in FIG. 1, a confirmation system 50 may include a server 70 operatively connected to a communications network 40 via a router/switch 60 or other type of network interface. The entities accessing and interacting with the confirmation system 50 include a lending institution computer 10, an accountant computer 20, and a client computer 30 according to one embodiment of the present invention. Third-party database 90 is coupled to the confirmation system 50 the of the communications network 40. In one embodiment, the third-party database may be a database of licensed certified public accountants (CPAs).

The accountant 20 is typically a CPA preparing financial statements for the client 30. The client 30 is the individual or entity that uses a CPA to prepare financial statements and/or tax returns, including, but not limited to, any business, corporation, non-profit organization, government department or any other entity whose financial statements are being audited (i.e., confirmed) for the purposes of loan origination.

In one embodiment of the present invention, all user entities have access to the confirmation system 50 via the communications network 40, which can be the Internet, a local area network, a wide area network or a conglomeration of various types of communications networks. The confirmation system 50 may be operated by an independent service provider or may be affiliated with a lending institution or accountant. In some embodiments, certain users accessing the confirmation system 50 may be charged for certain fees that may be paid electronically through a credit card company 80. Alternative embodiments are possible, such as directly debiting an account associated with the service purchaser. If paid for by a credit card, the credit card company 80 would interact with the system 50 via the communications network 40. Alternatively, the confirmation system 50 can be a client application embedded in one of the other individual user entity's existing system. For example, the confirmation system 50 can be integrated into a banking system run by the lending institution 10. In that way, for the bank user 10, the confirmation data exchange is accomplished through internal communications between different application modules.

Although FIG. 1 illustrates the router/switch 60 as being a separate entity from the server 70, in other embodiments, the router/switch 60 functionality may be integrated in the communications network 40 or incorporated in part into the server 70. Thus, in various embodiments, the confirmation system 50 may include a server 70 by itself without a separate router/switch 60.

Figure 1A:
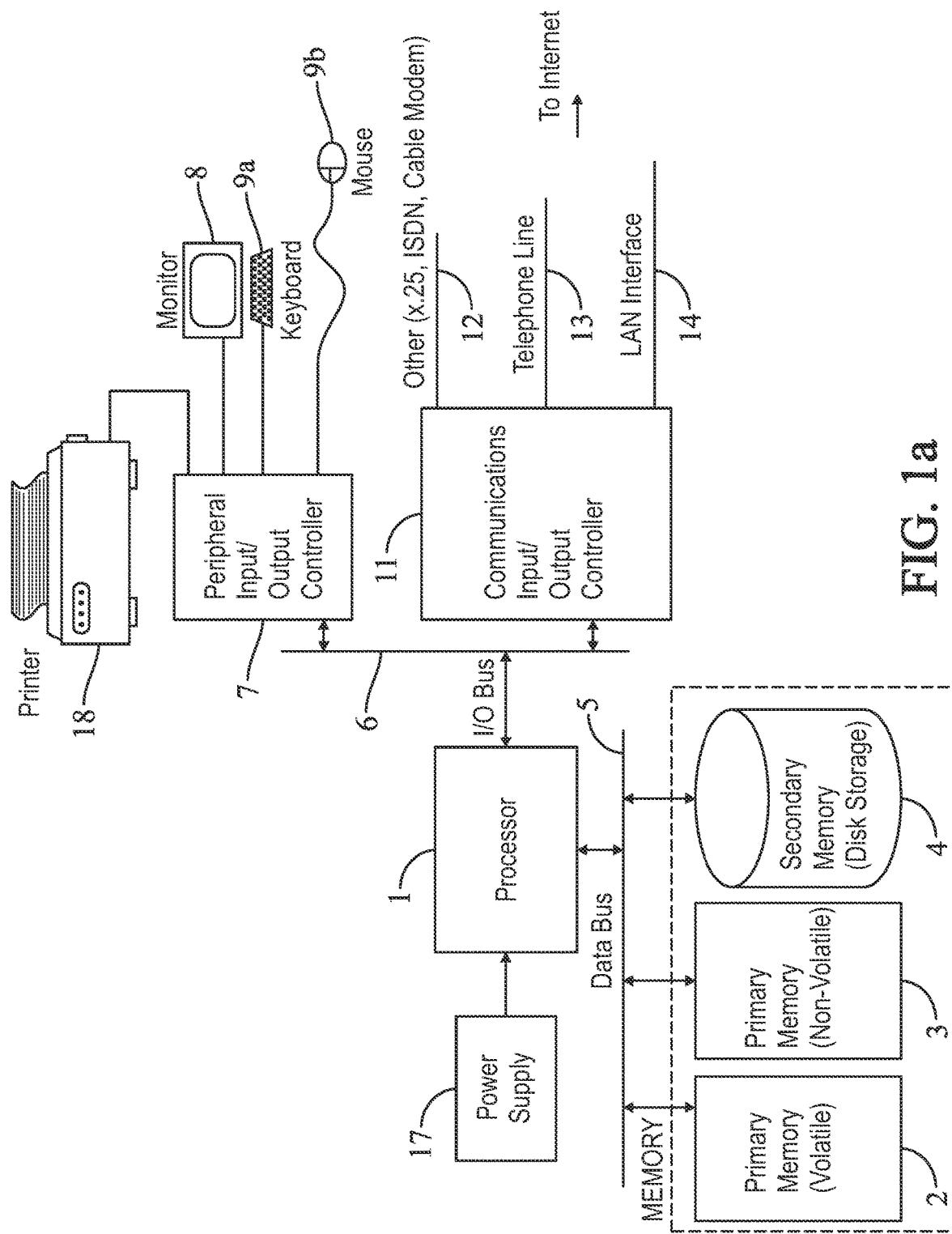
FIG. 1a is a block diagram illustrating one embodiment of the architecture of a confirmation system according to principles of the present invention.

A typical embodiment of the server for executing software providing confirmation servers is shown in FIG. 1a. Alternatively, or in addition, FIG. 1a illustrates a typical embodiment of a client computer 30, accountant computer 20, third-party database 90, or lending institution computer 10 that may execute the software.

Turning to FIG. 1a, one embodiment of the server 70 is illustrated that may include a computer used to practice aspects of the present invention. The same computer architecture could apply to either of the accountant or lending institution computer if the application is executed on those computers. In FIG. 1a, a processor 1, such as a microprocessor, is used to execute software instructions for carrying out the defined steps. The processor receives power from a power supply 17 that also provides power to the other components as necessary. The processor 1 communicates using a data bus 5 that is typically 16 or 32 bits wide (e.g., in parallel). Typical applications involve the processor receiving inputs, such as user input in the form of various numerical identifiers that are stored in the memory using the data bus. The data bus 5 is also used to convey data and program instructions, typically, between the processor and memory. In the present embodiment, memory can be considered primary memory 2 that is RAM or other forms which retain the contents only during operation, or it may be non-volatile 3, such as ROM, EPROM, HE PROM, FLASH, or other types of memory that retain the memory contents at all times. The memory could also be secondary memory 4, such as disk storage, that stores large amount of data. In some embodiments, the disk storage may communicate with the processor using a bus 6 instead or a dedicated bus (not shown). The secondary memory may be a floppy disk, hard disk, compact disk, DVD, or any other type of mass storage type known to those skilled in the computer arts.

The processor 1 also communicates with various peripherals or external devices using an I/O bus 6. In the present embodiment, a peripheral I/O controller 7 is used to provide standard interfaces, such as RS-232, RS422, DIN, USB, or other interfaces as appropriate to interface various input/output devices. Typical input/output devices include local printers 18, a monitor 8, a keyboard 9a, a mouse 9b or other typical pointing devices (e.g., roller ball, track pad, joystick, etc.) that are not shown.

The processor 1 typically also communicates using a communications I/O controller 11 with external communication networks, and may use a variety of interfaces such as data communication oriented protocols 12 such as X.25, ISDN, DSL, cable modems, etc. The communications controller 11 may also incorporate a modem (not shown) for interfacing and communicating with a standard telephone line 13. Finally, the communications I/O controller may incorporate an Ethernet interface 14 for communicating over a LAN. Any of these interfaces may be used to access the Internet, intranets, LANs, or other data communication facilities. The communications 10 is used by the processor to send data, such as account data or other data comprising a confirmation request response data.

Figure 1B:
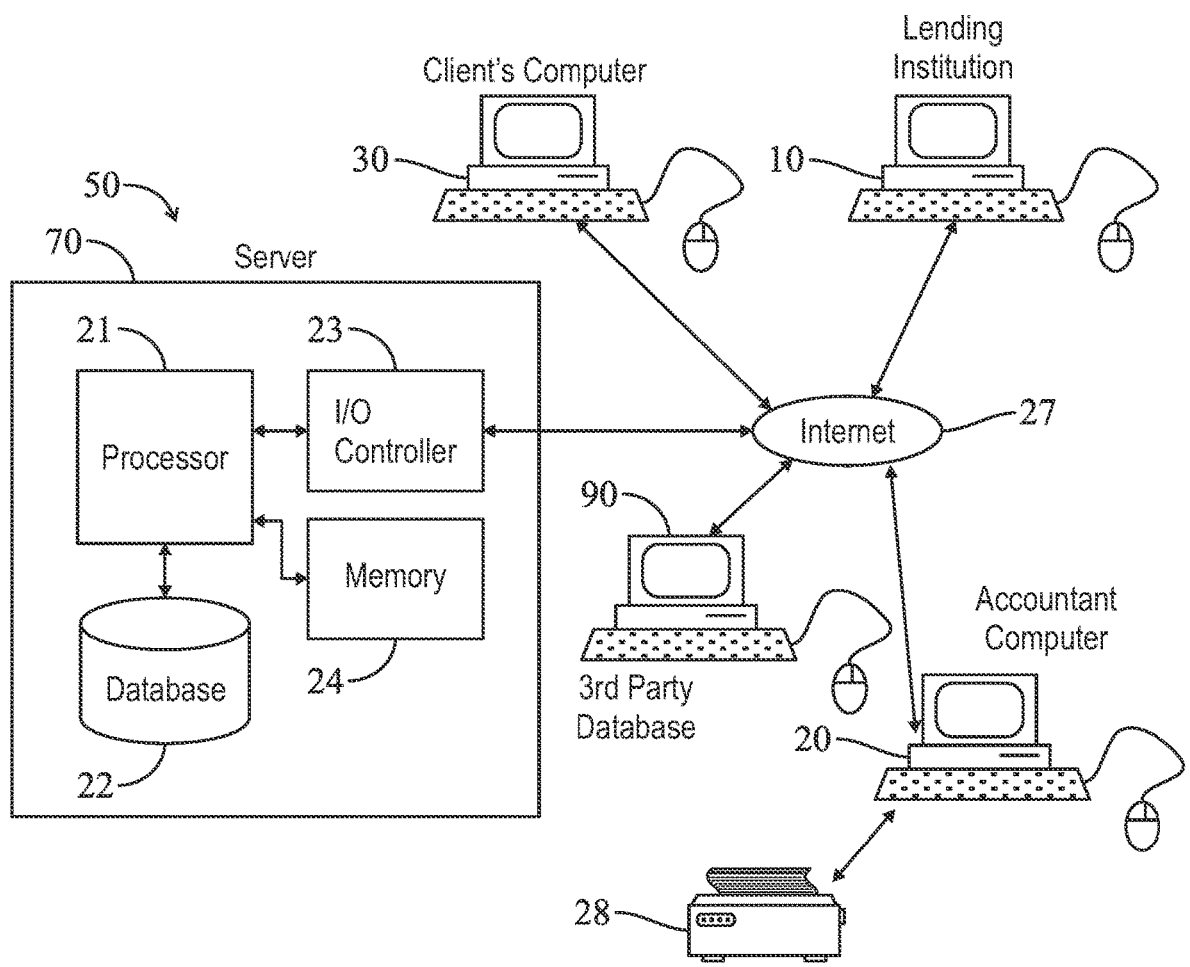
FIG. 1b is a block diagram illustrating another embodiment of the architecture of a confirmation system according to principles of the present invention.

An alternative embodiment of a processing system than may be used is shown in FIG. 1b. In this embodiment, the confirmation system 50 includes a server 70 communicating with a client computer 30, lending institution computer 10, and the accountant computer 20. In other embodiments, only a subset of the computers may be involved. The server 70 typically includes a processor 21 that communicates with a database 22, which can be viewed as a form of secondary memory and stores various confirmation requests, both pending and completed, as well as primary memory 24. The processor also communicates with external devices using an I/O controller 23 that typically interfaces with the Internet 27.

In this embodiment, each of the client computer 30, lending institution computer 10, and the accountant computer 20 incorporate a browser, such as the Microsoft Explorer" executing on a Windows operating system. The server 70 may utilize standard Internet protocols, such as HTTP, or secure encryption protocols, like HTTPS or other types of both secure and non-secure communication protocols as is known in the art, for communicating data, such as response data and soliciting confirmation request data from a user. Further, the accountant computer 20 may include a local printer 28 for printing local reports in order to provide a written record of the confirmation results or other data as described herein.

Those skilled in the art of data networking will realize that many other alternatives and architectures are possible and can be used to practice the principles of the present invention. The embodiments illustrated in FIGS. 1a and 1b can be modified in different ways and be within the scope of the present invention as claimed.

Figure 2:
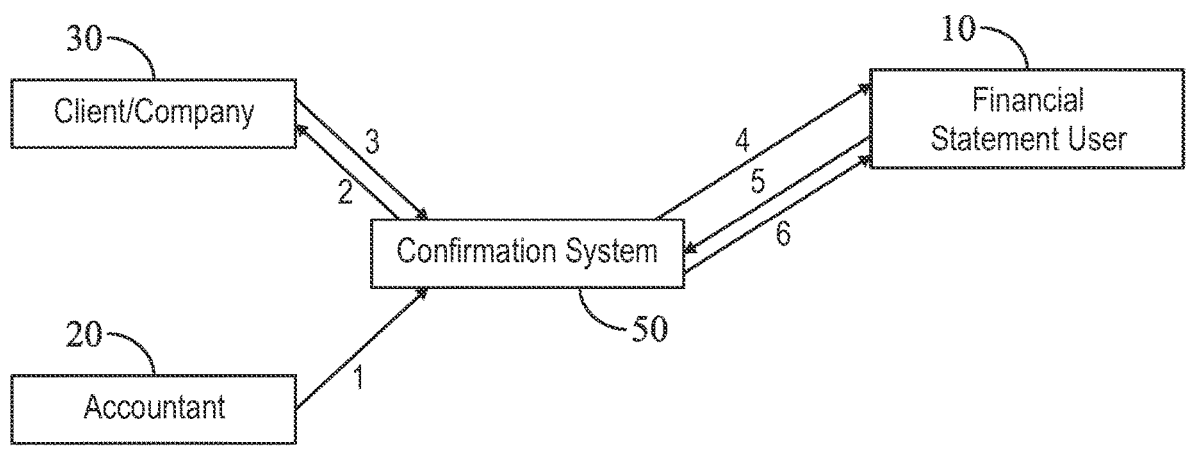
FIG. 2 is a high-level block and process flow diagram of an embodiment of a computer system for financial statement confirmations.

Turning to FIG. 2, a high-level block and process flow diagram of the interaction between the various aforementioned entities is demonstrated with exemplary steps for a first embodiment of the present invention. In step 1, the accountant 20 uses an accountant computer to upload the client's (i.e., business or potential borrower) financial statements to the confirmation system 50. The financial statements may include tax returns, audited financial statements, reviews, and compilations including balance sheets and income statements. Assuming that the accountant has a prior valid registration (signifying that the accountant is properly licensed in the appropriate jurisdiction) with the confirmation system 50, step one includes logging in using a pre-established username and password. If the accountant does not have a prior valid registration with the confirmation system 50, step one includes verifying that the accountant and/or the accounting firm is properly licensed to prepare the corresponding financial statement documents, followed by creating a username and password associated with the accountant.

Once the accountant 20 has logged into the confirmation system 50 with a valid username and password, the accountant creates a profile for or identifies the client or company 30. As described above, the accountant computer 20 then uploads the financial statements for the client 30 the confirmation system 50.

In step 2, if the client 30 is not already registered, the confirmation system 50 sends notification to the client 30 of their need to register. If the client 30 is already registered, the confirmation system 50 sends notification to the client 30 of financial statements available for review that were uploaded by the accountant 20.

In step 3, the client 30 sets permissions for the financial statements. The permissions can include view, print, and/or download, and the length of time or an expiration date for the permissions, and the entities given permission to access the financial statements stored at the confirmation system 50. Assuming that the client 30 has a prior valid registration with the confirmation system 50, step 2 includes logging in using a pre-established username and password for the client 30. If the client 30 does not have a prior valid registration with the confirmation system 50, step 1 includes creating a username and password associated with the client 30. Once the client 30 has logged into the confirmation system 50 with a valid username and password, the client 30 selects one or a group of financial statements. The client 30 then creates, identifies, or selects one or a group of lending institutions to associate with the selected financial statements. The client 30 can then set permissions for each selected lending institution with respect to each financial statement.

In step 4, if a lending institution 10 selected in step 3 by the client 30 is not already registered with the confirmation system 50, the confirmation system 50 sends notification to the unregistered lending institution 10 (or lending institutions) of their need to register with the confirmation system 50. If the lending institution 10 is already registered with the confirmation system 50, then the confirmation system 50 sends notification to the lending institution 10 that, the client 30 has designated financial statements for review, access, or download by the lending institution 10.

In step 5, assuming that the lending institution 10 has a prior valid registration with the confirmation system 50, step 4 includes logging in using a pre-established username and password for the lending institution 10. If the lending institution 10 does not have a prior valid registration with the confirmation system 50, step 4 includes creating a username and password associated with the lending institution 10.

After the lending institution 10 has logged into the confirmation system 50 with a valid username and password, the lending institution can perform actions with respect to the financial statements stored in the confirmation system 50 that are permitted by the permissions set by the client 30 in step 3 such as downloading and reviewing the financial statements.

In step 6, the confirmation system 50 provides the lending institution 10 with the financial statements associated with the client 30 based on the permission set by the client 30 in response to the request from the lending institution 10 in step 5.

Alternative embodiments and processes of the present invention are illustrated in FIGS. 3-8 and will now be described assuming that the parties (i.e., the accountant 20, the client 30, and the lending institution 10) are each registered with the confirmation system 50 such that they have pre-established usernames and passwords for logging into the confirmation system 50. If a party is not registered with the confirmation system 50, then the party may complete the process as described above for obtaining a pre-established username and password for logging into the confirmation system 50.

Figure 3:
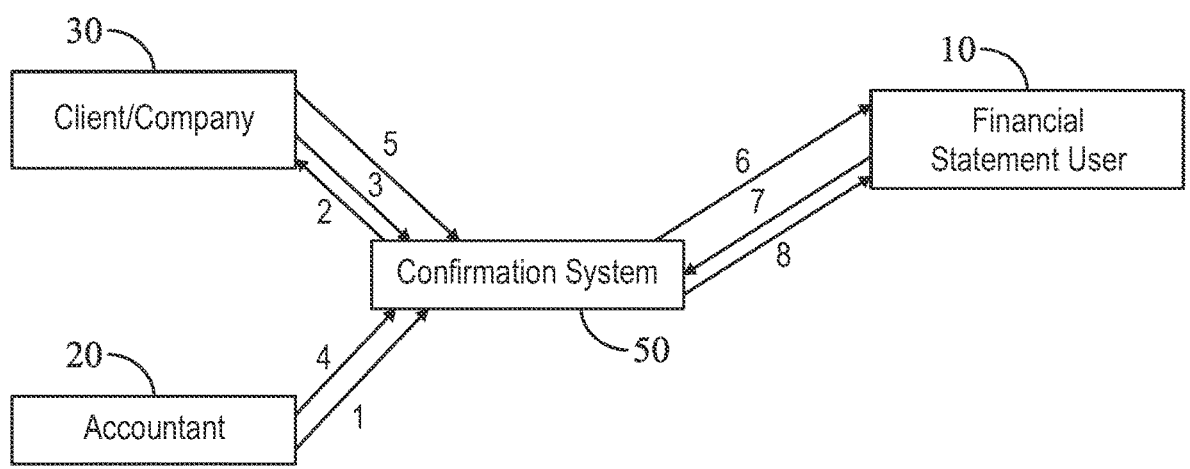
FIG. 3 is a high-level block and process flow diagram of another embodiment of a computer system for financial statement confirmations.

Referring to FIG. 3, in step 1, the accountant 20 logs into the confirmation system 50 and creates or identifies the client or business 30. In step 2, the confirmation system 50 sends a notification to the client 30 that the accountant 20 has requested to upload financial statements. In step 3, the client 30 logs into the confirmation system 50 and approves the accountant's request to upload financial statements. In step 4, the accountant 20 logs into the confirmation system 50 and uploads the financial statements. Optionally, the confirmation system 50 may notify the client 30 that the financial statements have been uploaded by the accountant 20 (e.g., via email). In step 5, once the client 30 has logged into the confirmation system 50 with a valid username and password, the client 30 selects one or a group of financial statements. The client 30 then creates, identifies, or selects one or a group of lending institutions to associate with the selected financial statements. The client 30 can then set permissions for each selected lending institution with respect to each financial statement. In step 6, the confirmation system 50 sends notification to the lending institution 10 that financial statements are ready to be viewed, accessed, or downloaded by the lending institution 10 based on the permission set by the client 30 in step 5. In step 7, the lending institution 10 logs into the confirmation system 50 and performs actions with respect to the financial statements permitted by the permission set by the client 30 in step 5. In step 8, the confirmation system 50 provides the lending institution 10 with the client's financial statements in response to the request by the lending institution 10 in step 7.

Figure 4:
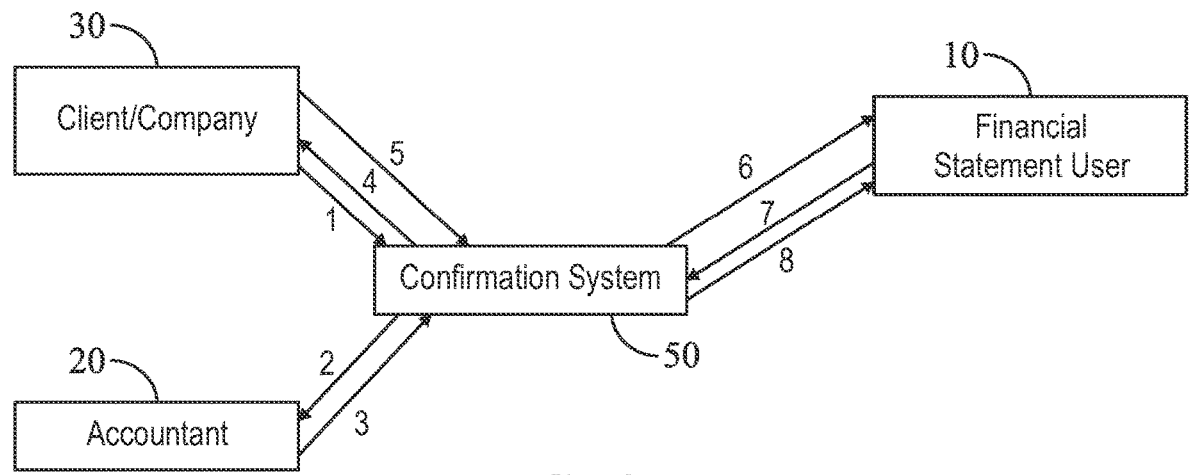
FIG. 4 is a high-level block and process flow diagram of another embodiment of a computer system for financial statement confirmations.

Referring to FIG. 4, in step 1, the client 30 logs into the confirmation system 50 and creates a profile or account for or identifies the accountant 20. In step 2, the confirmation system 50 notifies the accountant 20 that the client 30 has identified the accountant's upload of financial statements. In step 3, the accountant 20 logs in the confirmation system 50, selects the client 30, and uploads financial statements associated with the client 30. In step 4, the confirmation system 50 notifies the client 30 of the available financial statements uploaded by the accountant 20. In step 5, the client 30 logs into the confirmation system 50 selects one or a group of the uploaded financial statements, creates, identifies, or selects one or a group of lending institutions 10, and set permissions for each lending institution 10 with respect to each financial statement. In step 6, the lending institution 10 is notified by the confirmation system 50 that the client's financial statements are available for access by the lending institution 10. In step 7, the lending institution 10 logs into the confirmation system 50 and performs permitted actions with respect to the financial statements. In step 8, the confirmation system 50 provides the lending institution 10 with the clients financial statements based on the permissions and the request ley the lending institution 10 in step 7.

Figure 5:
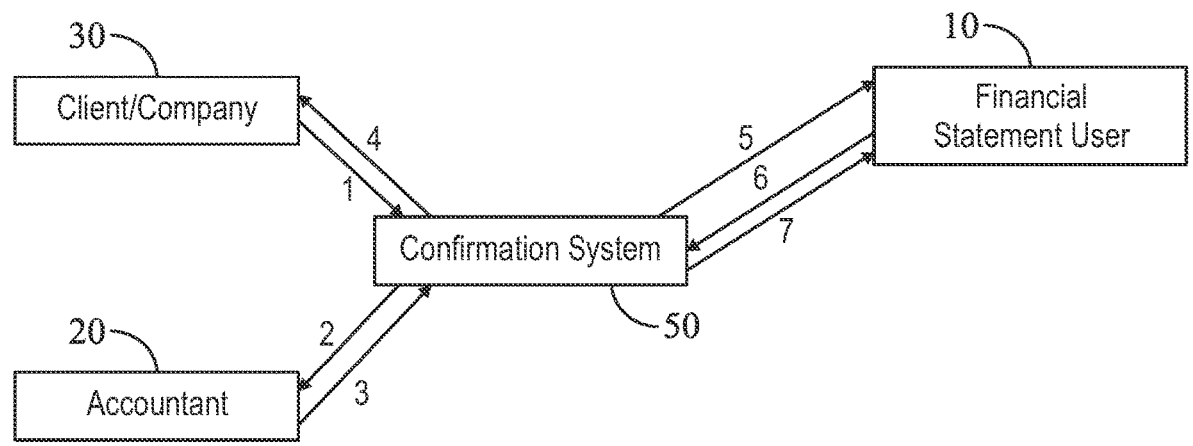
FIG. 5 is a high-level block and process flow diagram of another embodiment of a computer system for financial statement confirmations.

Referring to FIG. 5, in step 1, the client 30 logs in the confirmation system 50, identifies one or more accountants 20, identities one or more of a lending institutions 10, and set permissions for each of the lending institutions 10. In step 2, the accountant 20 is notified by the confirmation system 50 that financial statements are requested by the client 30 from the accountant 20. In step 3, the accountant 20 logs into the confirmation system 50 and uploads financial statements associated with the client 30 to the confirmation system 50. In step 4, the confirmation system 50 notifies the client 30 that the financial statements were uploaded by the accountant 20. In step 5, the confirmation system notifies the lending institution 10 that the financial statements associated with the client 30 are available. In step 6, the lending institution 10 logs into the confirmation system 50 and performs actions on the financial statements authorized (i.e., permitted) by the client 30 in step 1. In step 7, the confirmation system 50 provides the financial statements to the lending institution 10 in response to requests from the lending institution 10 in step 6 is allowed by the permissions set by the client 30 in step 1.

Figure 6:
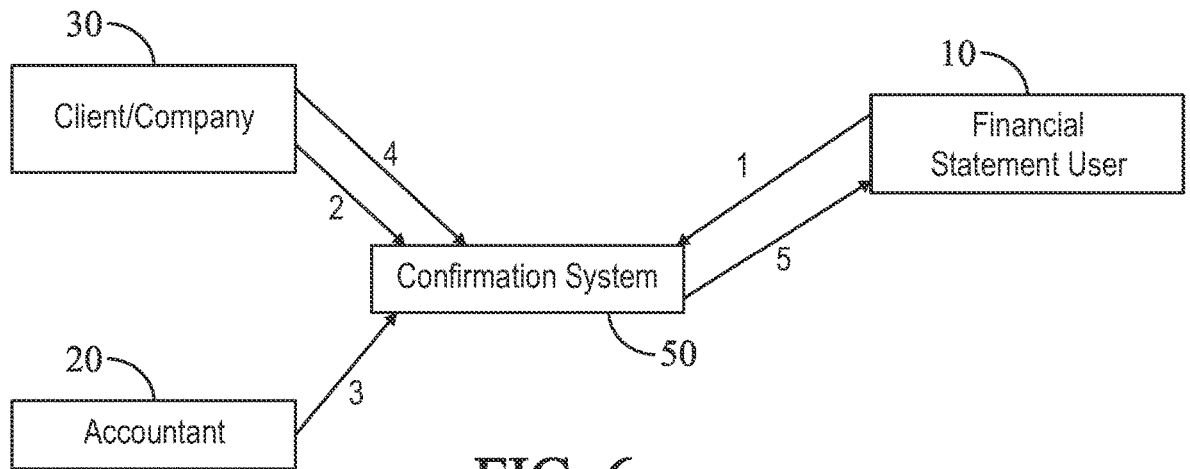
FIG. 6 is a high-level block and process flow diagram of another embodiment of a computer system for obtaining accountant prepared financial statements.
Figure 7:
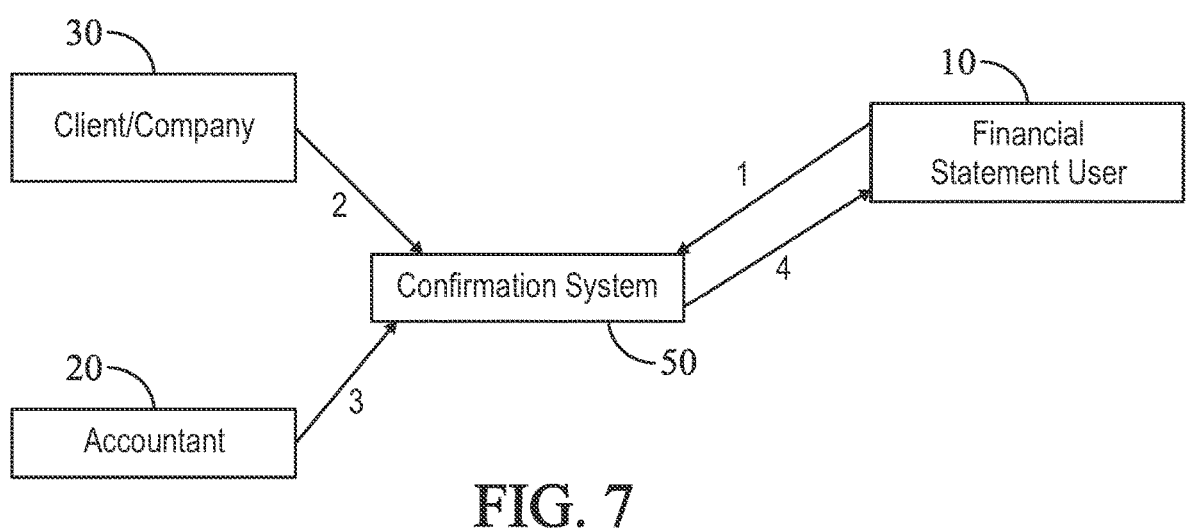
FIG. 7 is a high-level block and process flow diagram of another embodiment of a computer system for obtaining accountant prepared financial statements.
Figure 8:
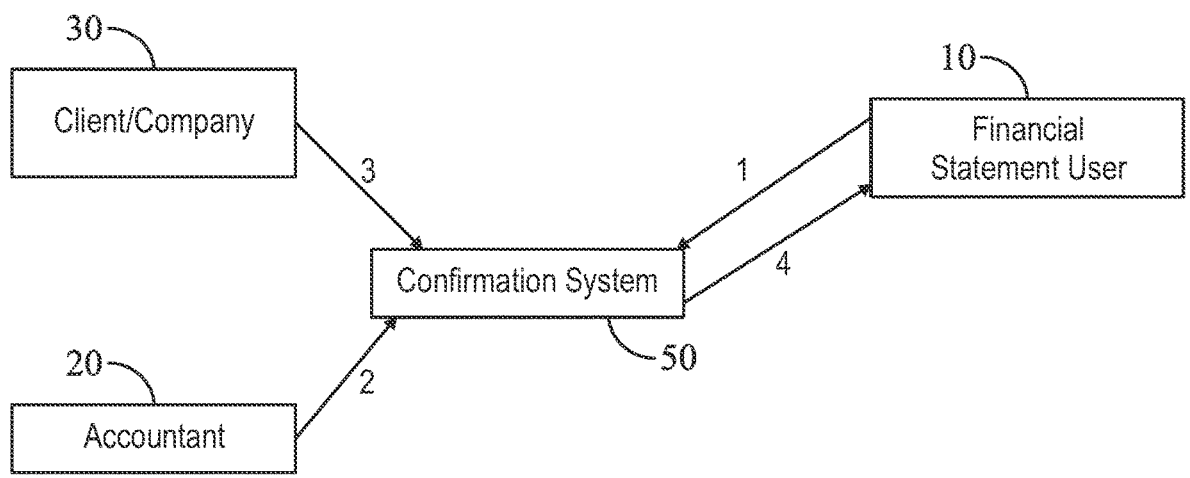
FIG. 8 is a high-level block and process flow diagram of another embodiment of a computer system for obtaining accountant prepared financial statements.

Referring to FIGS. 6-8, a method of obtaining accountant prepared financial statements begins when the financial statement user 10 logs in to the confirmation system 50 at step 1. The financial statement user 10 creates an account or profile for or identifies the client 30. It is contemplated that the financial statement user 10 may identify more than one client for which separate financial statements are to be obtained from an accountant associated with each of the clients while the financial statement user 10 is logged in. Optionally, the confirmation system 50 sends a notification to the client 30 that financial statements associated with the client 30 have been requested.

In step 2, the client 30 logs in to the confirmation system 50. The client 30 creates an account or profile for or identifies the accountant 20, Optionally, the confirmation system 50 sends a notification to the accountant 20 that financial statements prepared by the accountant 20 on behalf of the client 30 have been requested.

In step 3, the accountant 20 logs into the confirmation system 50 and identifies the client 30. The accountant 20 uploads financial statements associated with the identified client 30 to the confirmation system 50.

In step 4, if the client 30 is not already logged in to the confirmation system 50, then the client 30 logs into the confirmation system 50. The client selects one or group of financial statements uploaded to the confirmation system 50 and sets permissions for each selected financial statement or group of financial statements. Permissions include view, print, or download, and a length of time or expiration date for each permission.

In step 5, the financial statement user 10 logs into the confirmation system 50 and performs actions on the uploaded financial statements authorized (i.e., permitted) by the client 30 in step 4. The confirmation system 50 provides the financial statements to the lending institution 10 in response to requests from the lending institution 10 as allowed by the permissions set by the client 30 in step 4.

Referring to FIG. 7, a method of obtaining accountant prepared financial statements begins when the financial statement user 10 logs in to the confirmation system 50 at step 1. The financial statement user 10 creates an account or profile for or identifies the client 30. It is contemplated that the financial statement user 10 may identify more than one client for which separate financial statements are to be obtained from an accountant associated with each of the clients while the financial statement user 10 is logged in. Optionally, the confirmation system 50 sends a notification to the client 30 that financial statements associated with the client 30 have been requested.

In step 2, the client 30 logs in to the confirmation system 50. The client 30 creates an account or profile for or identifies the accountant 20. Optionally, the confirmation system 50 sends a notification to the accountant 20 that financial statements prepared by the accountant 20 on behalf of the client 30 have been requested. The client selects one or a group of financial statement users (e.g., financial statement user 10) and sets permissions for each selected financial statement user or group of financial statement users. Permissions include view, print, or download, and a length of time or expiration date for each permission. Optionally, the confirmation system 50 sends a notification to the accountant 20 that financial statements associated with the client 30 have been requested.

In step 3, the accountant 20 identified in step 2 logs into the confirmation system 50 and identifies or selects the client 30. The accountant 20 uploads financial statements associated with the identified client 30 to the confirmation system 50.

In step 4, the financial statement user 10 logs into the confirmation system 50 and performs actions on the uploaded financial statements authorized (i.e., permitted) by the client 30 in step 2. The confirmation system 50 provides the financial statements to the lending institution 10 in response to requests from the lending institution 10 as allowed by the permissions set by the client 30 in step 2.

Referring to FIG. 8, a method of obtaining accountant prepared financial statements begins when the financial statement user 10 logs in to the confirmation system 50 at step 1. The financial statement user 10 creates an account or profile for or identifies the accountant 20. Optionally, the confirmation system 50 sends a notification to the accountant 20 that financial statements associated with a client 30 of the accountant 20 have been requested.

In step 2, the accountant 20 identified in step 2 logs into the confirmation system 50 and creates a profile or account for or identifies the client 30. The accountant 20 uploads financial statements associated with the identified client 30 to the confirmation system 50. Optionally, the confirmation system 50 sends a notification to the client 30 that financial statements associated with the client 30 have been uploaded (i.e., provided) to the confirmation system 50.

In step 3, the client 30 logs in to the confirmation system 50. The client selects one or a group of financial statement users financial statement user 10) and sets permissions for each selected financial statement user or group of financial statement users. Permissions include view, print, or download, and a length of time or expiration date for each permission. Optionally, the confirmation system 50 sends a notification to the financial statement user 10 that financial statements associated with the client 30 have been received at the confirmation system 50.

In step 4, the financial statement user 10 logs into the confirmation system 50 and performs actions on the uploaded financial statements authorized (i.e., permitted) by the client 30 in step 3. The confirmation system 50 provides the financial statements to the lending institution 10 in response to requests from the lending institution 10 as allowed by the permissions set by the client 30 in step 3.

As used herein, it is contemplated that financial statements may also include audited financial statements, financial reviews, financial statement compilations, tax returns, or any other document containing financial information relating to the client 30.

In some embodiments, the confirmation system 50 analyzes the financial statements for financial information, and obtains confirmations of the financial information contained in the financial statements from third parties.

In some embodiments, the financial statements may be uploaded by the client 30 and verified by the accountant 20.

In some embodiments, the confirmation system 50 maintains a database (or accesses a third-party database) of licensed CPAs. The confirmation system 50 checks the status of the accountant 20 against the database of licensed CPAs. If the confirmation system 50 determines that the accountant 20 is not licensed or has an expired license, then the confirmation system 50 may notify the client 30 and/or the lending institution 10 that the accountant 20 is not licensed. The confirmation system 50 may further refuse to confirm the financial information in the financial statements provided by the accountant 20. In other embodiments, the database of licensed CPAs is maintained in a third-party database 90 external to the confirmation system 50. Similarly, confirmation system 50 checks the third-party database 90 to determine whether the accountant 20 is a licensed CPA.

A computer or computing device such as described herein has one or more processors or processing units, system memory, and some form of computer readable media. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Communication media typically embody computer readable instructions, data structures, program modules, or other data in a modulated data signal such as a carrier wave or other transport mechanism and include any information delivery media. Combinations of any of the above are also included within the scope of computer readable media.

The computer or computing device may operate in a networked environment using logical connections to one or more remote computers, such as a remote computer. Although described in connection with an exemplary computing system environment, embodiments of the invention are operational with numerous other general purpose or special purpose computing system environments or configurations. The computing system environment is not intended to suggest any limitation as to the scope of use or functionality of any aspect of the invention. Moreover, the computing system environment should not be interpreted as having any dependency or requirement relating to any one or combination of components illustrated in the exemplary operating environment. Examples of well known computing systems, environments, and/or configurations that may be suitable for use with aspects of the invention include, but are not limited to, personal computers, server computers, handheld or laptop devices, multiprocessor systems, microprocessor-based systems, set top boxes, programmable consumer electronics, mobile telephones, network PCs, minicomputers, interactive video game consoles, mainframe computers, distributed computing environments that include any of the above systems or devices, and the like.

Embodiments of the invention may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein. Aspects of the invention may also be practiced in distributed computing environments where tasks are performed by remote processing devices that are linked through a communications network (e.g., a local area network and/or the Internet). In a distributed computing environment, program modules may be located in both local and remote computer readable storage media including memory storage devices.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

It will be understood by those of skill in the art that information and signals may be represented using any of a variety of different technologies and techniques (e.g., data, instructions, commands, information, signals, bits, symbols, and chips may be represented by voltages, currents, electromagnetic waves, magnetic fields or particles, optical fields or particles, or any combination thereof). Likewise, the various illustrative logical blocks, modules, circuits, and algorithm steps described herein may be implemented as electronic hardware, computer software, or combinations of both, depending on the application and functionality. Moreover, the various logical blocks, modules, circuits, and controllers described herein may be implemented or performed with a general purpose processor (e.g., microprocessor, conventional processor, controller, microcontroller, state machine or combination of computing devices), a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. Similarly, steps of a method or process described herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. Although embodiments of the present invention have been described in detail, it will be understood by those skilled in the art that various modifications can be made therein without departing from the spirit and scope of the invention as set forth in the appended claims.

Thus, although there have been described particular embodiments of an invention, it is not intended that such references be construed as limitations upon the scope of this invention except as set forth in the following claims.

What is claimed is:

1. A method of independently confirming accuracy and validity of accountant prepared financial statements associated with a client via a confirmation server associated with a confirmation system, linked separately and independently via a communications network comprising secure encryption protocols to each of a financial statement user, the client, and an accountant, and wherein the confirmation system is operated by a service provider independent of any lending institution, the method being executed by one or more processors configured to implement operations comprising:
receiving from the accountant, by the confirmation system and via the communications network, an identification of the client and a request to upload one or more financial statements associated with the client;
querying an accountant license database, by the confirmation system, to determine at least a licensed or an unlicensed professional status of the accountant;
upon determining at least a licensed professional status of the accountant, transmitting a notification from the confirmation system to the client that the accountant has requested to upload the one or more financial statements;
responsive to approval from the client relating to the accountant request, securely receiving the one or more financial statements at the confirmation server from the accountant via the communications network;
notifying, by the confirmation system, the client that the one or more financial statements have been uploaded and are available only for review and release by the client via the confirmation system;
receiving selected permissions for approving one or more financial statement users comprising at least the financial statement user to access the one or more financial statements at the confirmation server via the communications network, the selected permissions corresponding to a selection received from the client wherein the selected permissions comprise download permission and a length of time or expiration time associated therewith, the selected permissions configured to be stored at the server of the confirmation system responsive to receipt of the selected permissions from the client after receipt of the financial statement;
notifying each of the one or more approved financial statement users that the one or more stored financial statements are accessible for download via the confirmation system; and
upon receiving a request to access at least one of the stored one or more financial statements from any one of the one or more approved financial statement users, securely transmitting the requested at least one financial statement, via the communications network, from the confirmation system to the requesting one or more approved financial statement users in accordance with the selected permissions, wherein the financial statement is unaltered by the client and transmitted from the accountant to the requesting one or more approved financial statement users exclusively via the confirmation system.

2. The method of claim 1, further comprising:
selectively storing at least one of pending and completed confirmation requests in a database.

3. The method of claim 1, wherein the database is a third-party database configured to contain information indicating whether an accountant is a certified public accountant.

4. The method of claim 1, wherein the transmitting the financial statements further comprises storing the received financial statements at the confirmation server.

5. The method of claim 1, further comprising:
analyzing the financial statement for financial information associated with the client; and
obtaining confirmation, via the communications network, of the financial information in the financial statement from a third party associated with the financial information.

6. The method of claim 1, wherein:
the financial statement comprises at least one of a balance sheet, cash flow statement, a financial review, or a compilation of financial information; and
the financial statement user is one of a lending institution and an investor.

7. A method of independently confirming accuracy and validity of accountant prepared financial statements associated with a client via a confirmation server associated with a confirmation system, linked separately and independently via a communications network comprising secure encryption protocols to each of a financial statement user, the client, and an accountant, and wherein the confirmation system is operated by a service provider independent of any lending institution, the method being executed by one or more processors configured to implement operations comprising:
receiving from the client, by the confirmation system and via the communications network, an identification of the accountant and a request for the accountant to upload one or more financial statements associated with the client;
querying an accountant license database, by the confirmation system, to determine at least a licensed or an unlicensed professional status of the accountant;
upon determining at least a licensed professional status of the accountant, transmitting a notification from the confirmation system to the accountant that the client has requested an upload of the one or more financial statements;
securely receiving the one or more financial statements at the confirmation server from the accountant via the communications network;
notifying, by the confirmation system, the client that the one or more financial statements have been uploaded and are available only for review and release by the client via the confirmation system;

receiving selected permissions for approving one or more financial statement users comprising at least the financial statement user to access the one or more financial statements at the confirmation server via the communications network, the selected permissions corresponding to a selection received from the client wherein the selected permissions comprise download permission and a length of time or expiration time associated therewith;

notifying each of the one or more approved financial statement users that the one or more stored financial statements are accessible for download via the confirmation system; and upon receiving a request to access at least one of the stored one or more financial statements from any one of the one or more approved financial statement users, securely transmitting the requested at least one financial statement, via the communications network, from the confirmation system to the requesting one or more approved financial statement users in accordance with the selected permissions, wherein the financial statement is unaltered by the client and transmitted from the accountant to the requesting one or more approved financial statement users exclusively via the confirmation system.

8. The method of claim 7, wherein the selected permissions for approving one or more financial statement users are received from the client and stored at the server of the confirmation system along with review and release of the one or more financial statements.

9. The method of claim 7, wherein the selected permissions for approving one or more financial statement users are received from the client and stored at the server of the confirmation system along with the received identification of the accountant and request for the accountant to upload one or more financial statements associated with the client.

10. The method of claim 7, further comprising:
selectively storing at least one of pending and completed confirmation requests in a database.

11. The method of claim 7, wherein the database is a third-party database configured to contain stores information indicating whether an accountant is a certified public accountant.

12. The method of claim 7, wherein the transmitting the financial statements, via the communications network, to the financial statement user in accordance with the permissions selected by the client further comprises storing the received financial statements at the confirmation server.

13. The method of claim 7, further comprising:
analyzing the financial statement for financial information associated with the client; and
obtaining confirmation, via the communications network, of the financial information in the financial statement from a third party associated with the financial information.

14. The method of claim 7, wherein:
the financial statement comprises at least one of a balance sheet, cash flow statement, a financial review, or a compilation of financial information; and
the financial statement user is one of a lending institution and an investor.

* * * * *